(12) United States Patent
Matsuki et al.

(10) Patent No.: US 6,848,315 B2
(45) Date of Patent: Feb. 1, 2005

(54) VIBRATION DETECTING SYSTEM OF RESILIENT BODY AND VIBRATING CONTACT DETECTION PROBE

(75) Inventors: Kaoru Matsuki, Tsukuba (JP); Kazuhiko Hidaka, Ushiku (JP); Kiyokazu Okamoto, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 61 days.

(21) Appl. No.: 10/075,650

(22) Filed: Feb. 14, 2002

(65) Prior Publication Data

US 2002/0108446 A1 Aug. 15, 2002

(30) Foreign Application Priority Data

Feb. 14, 2001 (JP) ...................................... 2001-037408

(51) Int. Cl.⁷ .............................................. G01B 5/016
(52) U.S. Cl. ..................... 73/651; 73/104; 73/866.5; 33/503; 33/504; 33/551; 33/556; 33/558; 33/559; 33/572
(58) Field of Search ........................ 73/104, 105, 579, 73/587, 632, 633, 634, 649, 651, 658, 866.5; 33/503, 504, 560, 561, 551, 556, 557, 558, 559, 572

(56) References Cited

U.S. PATENT DOCUMENTS

| | | | |
|---|---|---|---|
| 4,397,188 A | * | 8/1983 | Bansevichus et al. .......... 73/651 |
| 5,663,504 A | * | 9/1997 | Kluft ............................ 73/660 |
| 6,457,366 B1 | * | 10/2002 | Hidaka et al. ................. 73/634 |
| 6,516,669 B2 | * | 2/2003 | Matsuki et al. ............... 73/651 |

FOREIGN PATENT DOCUMENTS

| JP | 35-6030 | 1/1960 | | |
|---|---|---|---|---|
| JP | 48-60653 | 8/1973 | | |
| JP | 57-17530 | 1/1982 | | |
| JP | 57-206006 | 12/1982 | | |
| JP | 60-237732 | 11/1985 | | |
| JP | 63-217203 | 9/1988 | | |
| JP | 1-118333 | 8/1989 | | |
| JP | 2-22203 | 6/1990 | | |
| JP | 02-190240 | 7/1990 | | |
| JP | 04-140601 | 5/1992 | | |
| JP | 05-087507 | 4/1993 | | |
| JP | 06-221806 | 8/1994 | | |
| JP | 07-071907 | 3/1995 | | |
| JP | 07-135442 | 5/1995 | | |
| JP | 08-201010 | 8/1996 | | |
| JP | 9-502801 | 3/1997 | | |
| JP | 09/113251 | 5/1997 | | |
| JP | 10-307001 | 11/1998 | | |
| JP | 2000-055643 | 2/2000 | | |
| JP | 2002156219 A | * | 5/2002 | ........... G01B/21/00 |
| JP | 2002243538 A | * | 8/2002 | ........... G01H/11/02 |

OTHER PUBLICATIONS

British Patent Application for "Vibration–Type Contact Detection Sensor", Application No. 0111849.6, Filed May 15, 2001.

* cited by examiner

*Primary Examiner*—Hezron Williams
*Assistant Examiner*—Rose M. Miller
(74) *Attorney, Agent, or Firm*—Rankin, Hill, Porter & Clark LLP

(57) ABSTRACT

A stylus structure (40) integrally incorporating a stylus (2), a vibrator (4), a detector (6), a first secondary magnetic circuit (12) and a second primary magnetic circuit (21), and a stylus support (30) integrally incorporating a first primary magnetic circuit (11) and a second secondary magnetic circuit (22) are mutually fittable, thereby achieving signal transmission by the respective magnetic circuits using no electrical contact.

8 Claims, 9 Drawing Sheets

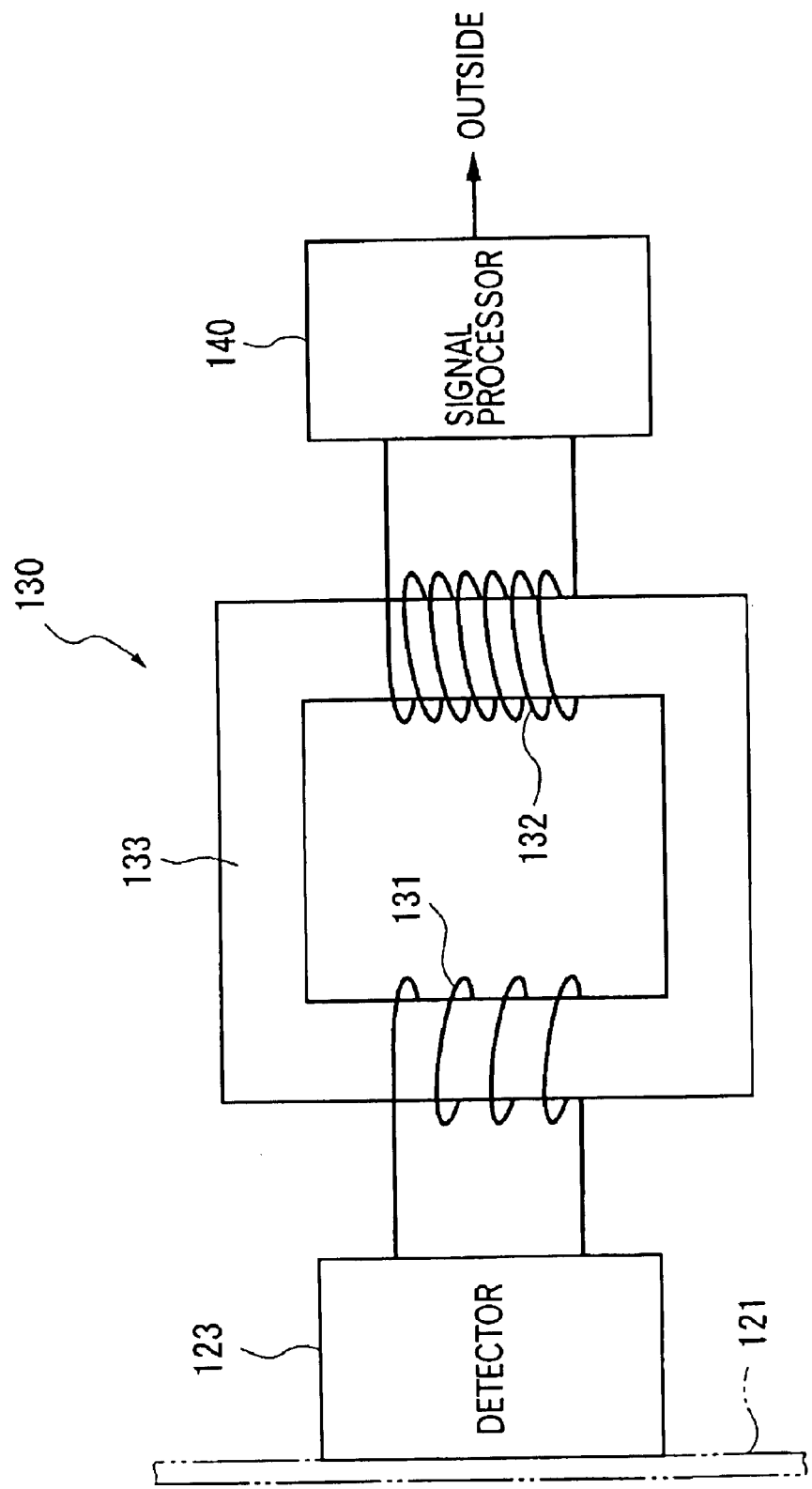

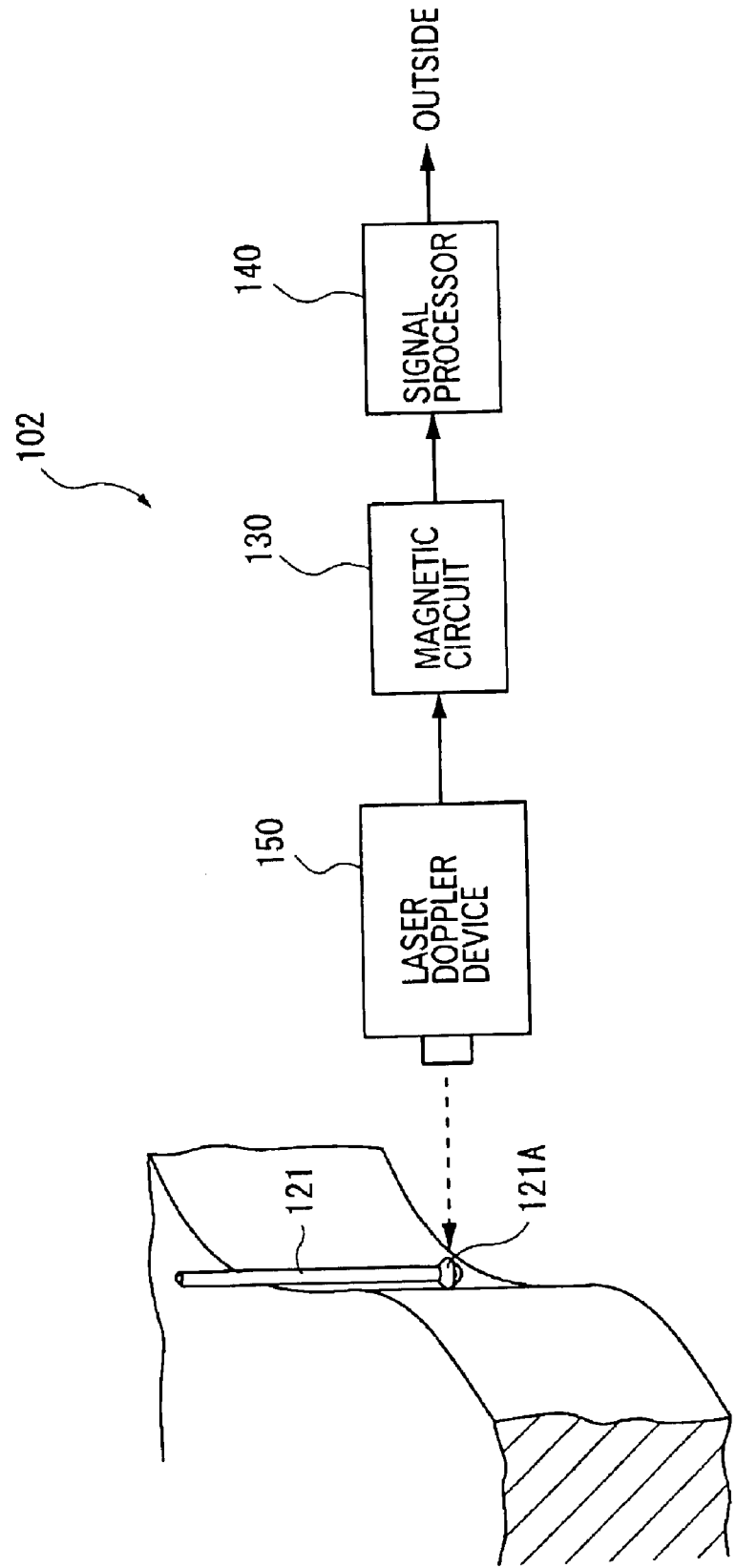

VIBRATION DETECTING SYSTEM OF RESILIENT BODY AND VIBRATING CONTACT DETECTION PROBE

BACKGROUND OF THE INVENTION

1. Field of the Invention

The present invention relates to a vibration detecting system of resilient body for detecting vibration of resilient body having multiple vibration mode, and a vibrating contact detection probe used for a form measuring instrument for measuring a minute surface texture of a workpiece in accordance with the same principle as the vibration detecting system.

2. Description of Related Art

Conventionally, a height gauge (one-dimensional measuring instrument), a coordinate measuring machine, a surface texture measuring machine, a small hole measuring machine etc. have been known as measuring instruments for measuring form and dimension etc. of a workpiece. Some of the measuring instruments employ a contact probe, the contact probe detecting contact with the workpiece to sense coordinates value of the workpiece and positional relationship between the workpiece and the measuring instrument.

A so-called vibrating contact probe has been used as one of the contact probes. The vibrating contact probe vibrates a stylus and detects change in vibration of the stylus caused when the stylus touches the workpiece to sense whether the measuring probe has contacted the workpiece or not with high accuracy.

In order to detect contact by vibration, the vibrating contact probe has a stylus having a contact portion to be in contact with a workpiece at a distal end thereof, a vibrator for vibrating the stylus and a detector for detecting the vibrating condition of the stylus. A vibrating element and detecting element using, for instance, piezoelectric element is used as the vibrator and the detector.

According to thus constructed vibrating contact probe, the stylus is initially vibrated by the vibrator and the change in vibration of the stylus caused when the contact portion of the stylus and the workpiece are brought into contact is detected by the detector. Change in detection signal outputted by the detector is observed to recognize the change in vibration of the stylus.

Incidentally, in the vibrating contact probe, in order to vibrate the stylus at a predetermined vibrating condition, the stylus is ordinarily vibrated with a main vibration mode (e.g. primary vibration mode).

However, even when the stylus is vibrated with the main vibration mode, vibration of a multiple vibration mode as well as the main-vibration-mode vibration is generated to the stylus on account of the configuration of the stylus and influence of the mass of the element attached to the stylus.

Accordingly, the action of the multiple-vibration-mode vibration is reflected on the detection signal obtained by the detector in addition to the action of the vibration of the main vibration mode, the action of the multiple-vibration-mode vibration causing noise on the vibration of the main vibration mode to lower S/N ratio thereof. Further, the wider frequency range of the vibration capable of being detected by the detector catches the more noise, thereby further reducing S/N ratio.

A filter having the same transmission characteristics may be used for restraining noise of the detection signal. However, such filter having certain characteristics corresponding to the main vibration mode has complicated structure and is expensive.

On the other hand, in the above-described conventional contact probe, since a lot of minute electrical connections are provided to the vibrator and the detector, the size and configuration of ordinary connector which establishes electric connection through a plug and receptacle cannot be fitted to a minute stylus in order to prevent cross talk which is required in view of performance. Further, changing work of the electric connection each time the stylus is exchanged is in itself difficult, and causes great problems in view of workability and work speed.

On the other hand, the work can be facilitated and speeded up by exchanging the entire probe including the support side of the stylus not only the side of the stylus. However, such arrangement is extremely expensive.

SUMMARY OF THE INVENTION

An object of the present invention it to provide a vibration detecting system of resilient body capable of obtaining detection signal having improved S/N ratio and recognizing the vibration of the resilient body with a simple and inexpensive arrangement.

A vibration detecting system of a resilient body according to an aspect of the present invention is for detecting vibration of the resilient body, the system includes: a detector for detecting the vibration of the resilient body and outputting a detection signal in accordance with the vibration; and a magnetic circuit having a primary coil and a secondary coil, the primary coil and the secondary coil being in close electromagnetic connection, in which the vibration of the resilient body is detected using an output signal generated in the secondary coil when the detection signal from the detector is received by the primary coil.

According to the above aspect of the present invention, the detection signal from the detector is received by the primary coil of the magnetic circuit and the output signal generated in the secondary coil by mutual induction is used to detect the vibration of the resilient body. Since the coil has a tendency that impedance thereof becomes greater as the frequency of electric current is raised, the high frequency component of the detection signal corresponding to the multiple vibration mode as a noise can be substantially removed. Accordingly, since the output signal removing the noise from the detection signal can be generated in the secondary coil, the change in the output signal generated in the secondary coil can be sensed with high accuracy, so that, when outside force (such as contact with a workpiece) is applied to the resilient body, the change in the action of the vibration of the resilient body can be detected with high accuracy.

Further, since the primary coil and the secondary coil are in close electromagnetic connection in the magnetic circuit, voltage is generated in the secondary coil when the alternating current signal passes through the primary coil and no voltage is generated in the secondary coil when direct current signal having no change in electric current passes through the primary coil. Accordingly, even when static electricity is generated upon contact of the resilient body with the workpiece etc., since the static electricity is direct current, the influence on the voltage generated in the secondary coil can be avoided.

Since the winding number of the secondary coil is more than the winding number of the primary coil, the amplified amplitude of the output signal by boosting the amplitude of the detection signal received by the primary coil can be generated by the secondary coil.

Since the magnetic circuit enabling close electromagnetic connection between the primary coil and the secondary coil is used, the arrangement of the vibration detecting system can be easily and inexpensively constructed unlike the conventional arrangement using a filter of specific transmission characteristics.

In the above aspect of the present invention, the detector may preferably be attached to the resilient body and constructed of a piezoelectric element or a strain detecting element.

According to the above arrangement, since the detector is attached to the resilient body and is constructed of piezoelectric element or strain detecting element, the structure of the detector can be simplified and the production cost thereof can be reduced. The strain detecting element refers to an element for outputting electric potential in accordance with strain of an object such as a strain gauge.

The above word "attach" includes both of direct attachment of the piezoelectric element of the strain detecting element to the resilient body and indirect attachment through a member for holding the resilient body.

In the above aspect of the present invention, the detector may preferably be located around the resilient body and constructed of a non-contact detecting element for detecting the vibration of the resilient body in a non-contact manner.

According to the above aspect of the present invention, since the detector is constructed of a non-contact detecting element such as an optical fiber and a laser Doppler device, the influence on the vibration of the resilient body on account of contact between the resilient body and the detector can be eliminated, thereby improving the accuracy for detecting the vibration of the resilient body.

Another object of the present invention is to provide a vibrating contact detection probe capable of eliminating change of electric connection of the vibrator and the detector annexed to the stylus in exchanging the stylus. Specifically, in the vibrating contact detection probe according to the present invention, re-calibration after exchange including small stylus can be easily and rapidly conducted and trouble for changing electric connection of the vibrator and the detector annexed to the stylus can be eliminated while maintaining various conditions.

In exchanging the stylus, when only the stylus-side part is to be exchanged, possible action parameter to be updated is vibration frequency and detection gain. By commanding the data to the controller on the stylus support side in exchanging the stylus, the data can be appropriately adjusted to a computer of the controller, re-adjustment can be easily and rapidly conducted.

Mechanical dimension of the parts to be exchanged including the stylus can be independently calibrated in advance by a calibration means. When the position for attaching the exchanged part is reproduced in exchanging the stylus, mechanical re-calibration after exchange can be easily and rapidly conducted only by measuring minute mechanical value.

In view of the above, a vibrating contact detection probe according to the present invention uses close electromagnetic connection as in the above-described vibration detecting system to eliminate change of electric connection of the vibrator and the detector annexed to the stylus in exchanging the stylus.

A vibrating contact detection probe according to another aspect of the present invention includes: a shaft-shaped stylus having a contact portion to be in contact with a workpiece; a vibrator for causing resilient vibration to the stylus when electrical alternating current energy is applied thereto; a detector for detecting the action of the vibration changing in accordance with contact of the contact portion with the workpiece; a vibration energy transmitter for applying the electrical alternating current energy to the vibrator; a detection signal transmitter connected to the detector; and a stylus support and a stylus structure being mutually fitted, the vibration energy transmitter having a first primary magnetic circuit having a first primary coil connected to a vibration energy source and a first secondary magnetic circuit having a first secondary coil connected to the vibrator, the detection signal transmitter including a second primary magnetic circuit having a second primary coil connected to the detector and a second secondary magnetic circuit having a second secondary coil for fetching the detection signal, the stylus, the vibrator, the detector, the first secondary magnetic circuit and the second primary magnetic circuit being integrated on the stylus structure, the first primary magnetic circuit and the second secondary magnetic circuit being integrated on the stylus support, where, when the stylus structure and the stylus support are fitted, electromagnetic connection is established between the first primary magnetic circuit and the first secondary magnetic circuit and between the second primary magnetic circuit and the second secondary magnetic circuit and mechanical position of the stylus relative to the stylus support can be reproduced.

According to the above arrangement, since the stylus structure integrally incorporating the stylus, the vibrator, the detector, the first secondary magnetic circuit and the second primary magnetic circuit, and the stylus support integrally incorporating the first primary magnetic circuit and the second secondary magnetic circuit are mutually fittable, only the stylus structure is required to be exchanged in exchanging the stylus, so that re-calibration after exchange including small stylus can be easily and rapidly conducted, and trouble for changing electric connection of the vibrator and the detector annexed to the stylus can be eliminated while maintaining various conditions.

In the vibrating contact detection probe of the present invention, the second primary magnetic circuit and the second secondary magnetic circuit may preferably be disposed without being in electromagnetic connection with the other electromagnetic system of the stylus structure and the other electromagnetic system of the stylus support.

According to the above arrangement, since the second primary and the secondary magnetic circuits for transmitting the detection signal is not in electromagnetic connection with the other electromagnetic system on the side of the stylus structure and the stylus support, the S/N ratio of the detection signal, which is weak relative to the electromagnetic amount of the vibration energy, is not deteriorated.

In the vibrating contact detection probe of the present invention, the respective pairs of the first primary coil and the secondary coil and the second primary coil and the secondary coil may preferably be disposed coaxially along an axial direction of the stylus.

According to the above arrangement, since the respective pairs of coils are disposed coaxially along the axial direction of the stylus, the coils can be easily installed and the probe can be easily manufactured.

In the vibrating contact detection probe of the present invention, the first primary coil and the secondary coil and the second primary coil and the secondary coil may preferably be constructed of a toroidal coil.

According to the above arrangement, since the respective coils are constructed of toroidal coil, leakage of magnetic flux can be reduced.

In the vibrating contact detection probe of the present invention, the stylus structure and the stylus support may preferably be formed by a pair of structures fitted to form a cylinder or a polygonal tube which is separated in parallel with a central axis thereof.

According to the above arrangement, since the stylus structure and the stylus support are fitted to form a cylinder or a polygonal tube, the size of the probe can be reduced and the probe can be easily disassembled and re-fitted.

In the vibrating contact detection probe of the present invention, the stylus structure and the stylus support may preferably be formed by an inner and outer coaxial cylinders having a common axis or a pair of coaxial inner and outer polygonal tubes.

According to the above arrangement, the stylus structure and the stylus support can be fitted in the axial direction and can be easily fixed by, for instance, a setscrew.

In the vibrating contact detection probe of the present invention, an amplifier of the detector may preferably be provided, the amplifier being driven by a power generated by the first secondary coil using a part of electrical alternating current energy.

According to the above arrangement, when the detection signal is too weak for actual use, the detection signal can be amplified by the amplifier. Further, the amplifier can be driven by the first secondary coil using a part of the electric alternating current energy, thereby enabling efficient drive thereof.

In the vibrating contact detection probe of the present invention, an amplifier of the detector may preferably be provided, the amplifier being driven by a power generated using a part of electrical alternating current energy supplied by a third coil independent of the first primary and secondary coils and the second primary and secondary coils.

According to the above arrangement, when there is not sufficient amount in the transmission received by the first secondary coil, the amplifier can be driven by the electric alternating current energy supplied by the third coil independent of the first primary and secondary coils and the second primary and secondary coils.

BRIEF DESCRIPTION OF THE DRAWINGS

FIG. 8 is an illustration schematically showing magnetic circuit etc. of the fifth embodiment; and FIG. 9 is an illustration schematically showing a primary portion of the system according to sixth embodiment of the present invention.

DETAILED DESCRIPTION OF PREFERRED EMBODIMENT(S)

Figure 1:
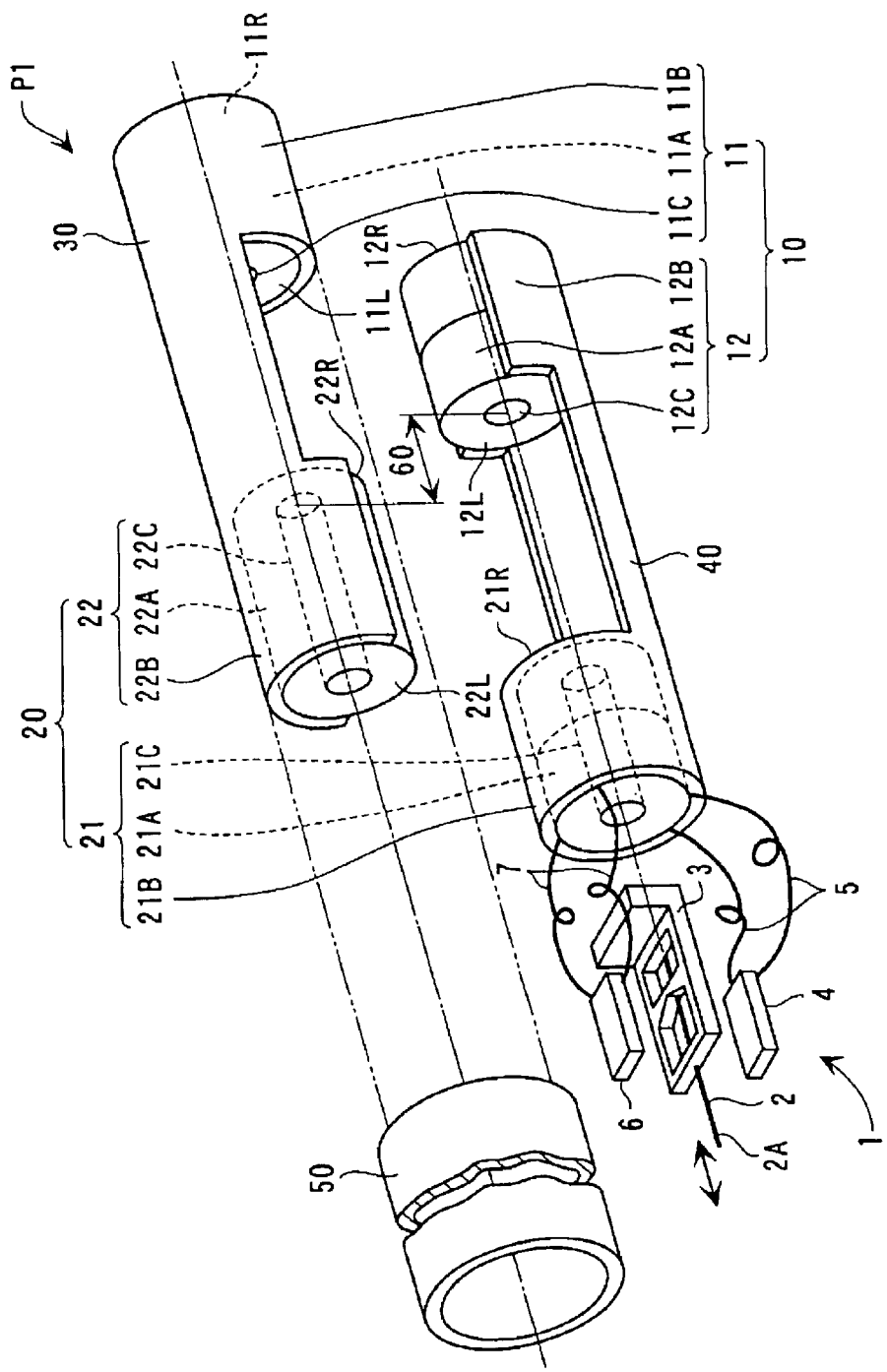
FIG. 1 is an exploded perspective view showing a vibrating contact detection probe according to first embodiment of the present invention.

Preferred embodiments of the present invention will be described below with reference to attached drawings. Incidentally, the same reference numeral will be attached to the same components and description thereof is omitted or simplified in the following description of the embodiment.

[First Embodiment]

FIG. 1 shows a vibrating contact detection probe P1 according to first embodiment. The vibrating contact detection probe P1 has a stylus 2, a stylus assembly 1 having a vibrator 4 and a detector 6, a vibration energy transmitter 10 for applying electrical alternating current energy to the vibrator 4, a detection signal transmitter 20 connected to the detector 6, a stylus support 30 and a stylus structure 40 mutually fitted together, and an outer cylinder sleeve 50 composed of a magnetic body.

The stylus assembly 1 includes the stylus 2 having a contact portion 2A to be in contact with a workpiece and having shaft-shape, a resilient element attaching body 3 holding an intermediate portion of the stylus 2, the vibrator 4 composed of a piezoelectric element attached to one side of the resilient element attaching body 3 for causing resilient vibration (axial direction vibration of the stylus 2: vibration in arrowed direction) by applying electrical alternating current energy, a vibrator electrically connecting lead wire 5 connected to the vibrator 4, the detector 6 composed of a piezoelectric element for detecting action of the vibration changing in accordance with the contact of contact portion 2A of the stylus 2 with the workpiece, and a detector electrically connecting lead wire 7 connected to the detector 6.

The vibration energy transmitter 10 has a fist primary magnetic circuit 11 and a first secondary magnetic circuit 12.

The first primary magnetic circuit 11 is composed of a primary coil 11A connected to a vibration energy source, a yoke 11B and a magnetic core 11C.

The first secondary magnetic circuit 12 is composed of a secondary coil 12A connected to the vibrator 4 through the vibrator electrically connecting lead wire 5, a yoke 12B and a magnetic core 12C.

The detection signal transmitter 20 has a second primary magnetic circuit 21, and a second secondary magnetic circuit 22.

The second primary magnetic core 21 is composed of a primary coil 21A connected to the detector 6 through the detector electrically connecting lead wire 7, a yoke 21B and a magnetic core 21C.

The second secondary magnetic core 22 is composed of a secondary coil 22A for fetching the detection signal, a yoke 22B and a magnetic core 22C.

In the stylus support 30, the first primary magnetic circuit 11 and the second secondary magnetic circuit 22 are accommodated in an integrated manner. Specifically, the first primary magnetic circuit 11 and the second secondary magnetic circuit 22 are integrated by the stylus support 30. Incidentally, the stylus support 30 also works as the yoke 11B of the first primary magnetic circuit 11 and the yoke 22B of the second secondary magnetic circuit 22.

The stylus 2, the vibrator 4, the detector 6, the first secondary magnetic circuit 12 and the second primary magnetic circuit 21 are accommodated in the stylus structure 40 in an integrated manner. In other words, the stylus 2, the vibrator 4, the detector 6, the first secondary magnetic circuit 12 and the second primary magnetic circuit 21 are integrated by the stylus structure 40. Incidentally, the stylus structure 40 also works as the yoke 12B of the first secondary magnetic circuit 12 and the yoke 21B of the second primary magnetic circuit 21.

The stylus structure 40 and the stylus support 30 are mutually fitted to be a cylinder. Accordingly, the stylus structure 40 and the stylus support 30 respectively form a pair of structures divided in parallel with the central axis of the cylindrical body after being fitted.

When the stylus structure 40 and the stylus support 30 are fitted, the primary coil 11A and the secondary coil 12A of the first pair and the primary coil 21A and the secondary coil 22A of the second pair are mutually located coaxially along the axis direction (central axis of the stylus structure 40 and the stylus support 30) of the stylus 2.

When the stylus structure 40 and the stylus support 30 are fitted, an end surface 11L of the first primary magnetic circuit 11 and an end surface 12R of the first secondary magnetic circuit 12, and an end surface 21R of the second primary magnetic circuit 21 and an end surface 22L of the second secondary magnetic circuit 22 are in close contact and a gap 60 is formed between the end surface 12L of the first secondary magnetic circuit 12 and the end surface 22R of the second secondary magnetic circuit 22. Specifically, the pair of the first primary magnetic circuit 11 and the first secondary magnetic circuit 12 and the pair of the second primary magnetic circuit 21 and the second secondary magnetic circuit 22 are in close electromagnetic connection, and the first secondary magnetic circuit 21 and the second secondary magnetic circuit 22 are kept in coarse electromagnetic connection. Accordingly, the S/N ratio of the relatively weak detection signal as compared to the electromagnetism of the vibration energy is not deteriorated. In other words, the second primary and secondary magnetic circuits 21 and 22 (coil group 21A, 22A) are not electromagnetically connected to the other electromagnetic systems of the stylus structure 40 and the stylus support 30.

Incidentally, in order to avoid electromagnetic cross talk, it is practically important that the vibrator electrically connecting lead wire 5 and the detector electrically connecting lead wire 7 are isolated by the magnetic body of the stylus structure and are mutually separated when being disposed in the same space. Accordingly, in FIG. 1, the lead wires on the outer end surface of the stylus structure 40 are spatially separated.

In assembly process, the stylus structure having the stylus 2, the vibrator 4, the detector 6, the first secondary magnetic circuit 12 and the secondary primary magnetic circuit 21 is fitted with the stylus support 30 having the first primary magnetic circuit 11 and the second secondary magnetic circuit 22. Subsequently, the outer cylinder sleeve 50 is attached on the outside thereof. Accordingly, mechanical position of the stylus 2 relative to the stylus support 30 can be reproduced with high accuracy.

On the other hand, in order to release fitting between the stylus structure 40 and the stylus support 30, it is only necessary that the outer cylinder sleeve 50 is initially detached and the stylus structure 40 is detached from the stylus support 30. The manipulation can be extremely easily and rapidly conducted and no electrical connection of the vibrator electrically connecting lead wire 5 and the detector electrically connecting lead wire 7 is required.

In other words, since it is only necessary to exchange the stylus structure 40 in exchanging the stylus 2, re-calibration after exchange including minute stylus can be easily and rapidly conducted, so that trouble for changing electrical connection of the vibrator 4 and the detector 6 attached to the stylus 2 can be eliminated while maintaining various conditions.

[Second Embodiment]

Figure 2:
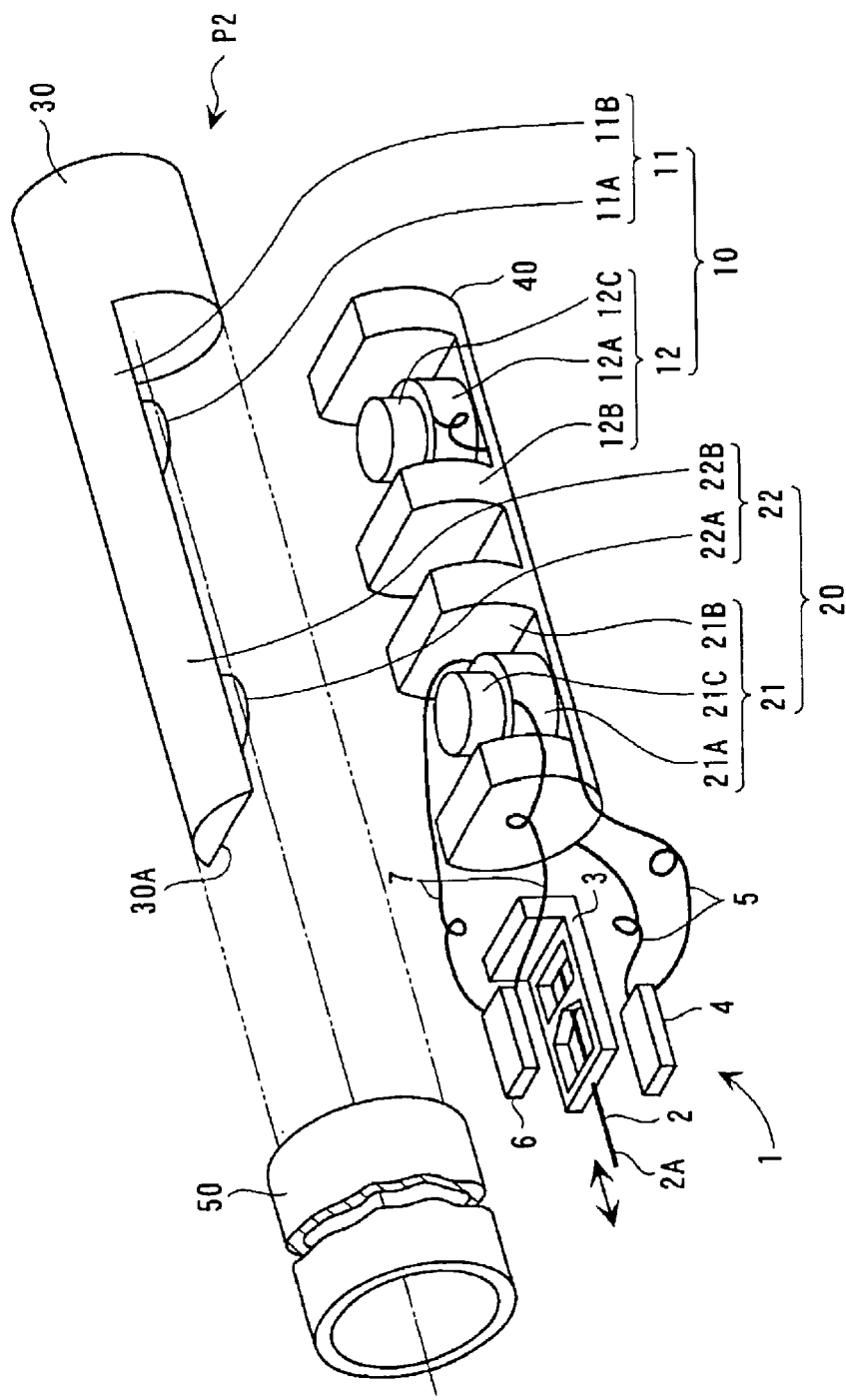
FIG. 2 is an exploded perspective view showing a vibrating contact detection probe according to second embodiment of the present invention.

FIG. 2 shows a vibrating contact detection probe P2 according to second embodiment of the present invention.

The vibrating contact detection probe has different form of primary coils 11A and 21A and secondary coils 12A and 22A constituting the first and the second magnetic circuits 11, 12, 21 and 22 as compared to the vibrating contact detection probe P1 of the first embodiment. Specifically, when the stylus structure 40 and the stylus support 30 are fitted, the respective pairs of the first coils 11A and 12A and the second coils 21A and 22A are disposed orthogonal with the axial direction of the stylus 2, not coaxial.

Further, the stylus 30 has a plane 30A cutting a cylindrical body made of magnetic body with a plane parallel to central axis thereof, the plane 30A also working as the end surfaces 11L and 22L. Accordingly, the magnetic circuits 11 and 22 disposed to the side of the stylus support 30 have no magnetic cores 11C and 22C.

Instead, in order to achieve electrically close connection with the stylus structure 40, three portions of the stylus structure 40 are to be in close contact. Specifically, the plane 30A is in close contact with the magnetic cores 12C and 22C of the stylus structure 40 and both sides sandwiching thereof (corresponding to the end surfaces 12R and 21R).

According to the second embodiment, since the cross section of the coil can be freely increased and decreased along the axial direction, great freedom of design can be achieved as long as the capacity of the transmitted vibration energy and the detection signal by the coil can be tolerated in view of the characteristics of the magnetic circuit.

However, when the stylus structure 40 is fitted to the stylus support 30, the stylus support 30 and the stylus structure 40 form two components divided in parallel along the central axis of the cylindrical structure as in the first embodiment.

[Third Embodiment]

Figure 3:
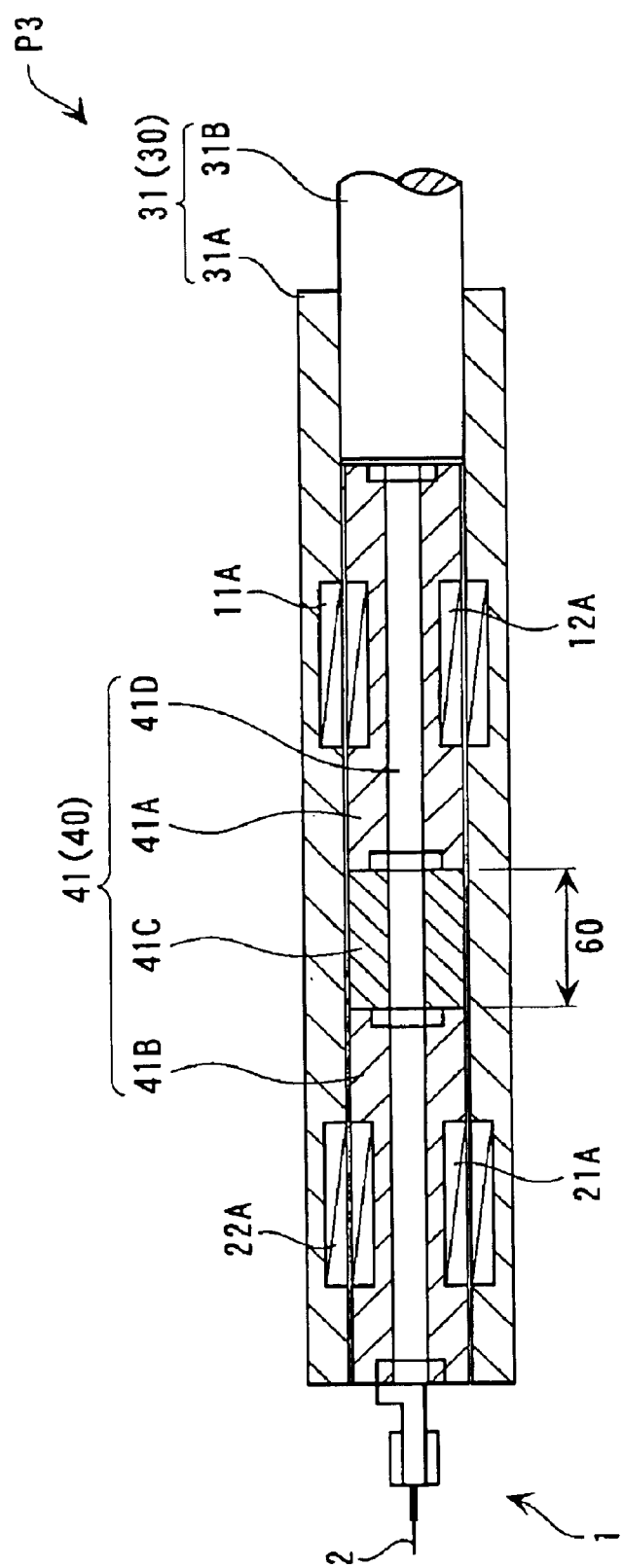
FIG. 3 is a cross section showing a vibrating contact detection probe according to third embodiment of the present invention.

FIG. 3 shows a vibrating contact detection probe P3 according to third embodiment of the present invention.

In the vibrating contact detection probe P3, the stylus support 30 and the stylus structure 40 are composed of a pair of an outer cylinder and an inner cylinder of a coaxial inside and outside cylindrical structures having a common axis. In the present embodiment, the stylus support 30 is structured by an outer cylinder 31 and the stylus structure 40 is structured by an inner cylinder 41.

The outer cylinder 31 is composed of a sleeve 31A constructed of a magnetic body and a fitting member 31B fitted to a base end of the sleeve 31A. A first primary coil 11A and a second secondary coil 22A are disposed on the inner circumference of the sleeve 31A mutually spaced apart by a predetermined interval.

The inner cylinder 41 is composed of two insert cylinders 41A and 41B, a spacer 41C, and a connection bolt 41D for integrating the components. On the outer circumference of the insert cylinder 11A, a first secondary coil 12A is disposed at a position corresponding to the first primary coil 11A. On the outer circumference of the insert cylinder 41B, a second primary coil 21A is disposed at a position corresponding to the second secondary coil 22A. The outer cylinder 31 and the insert cylinders 41A and 41B are made of magnetic body so that close electrical connection between the first and the second pairs of coils can be established. The spacer 41C is composed of a non-magnetic material in order to provide the gap 60.

Incidentally, the first primary coil 11A and the secondary coil 12A, and the second primary coil 21A and the secondary coil 22A are formed parallel and coaxial with a common axis in solenoid shape.

According to the third embodiment, since the stylus structure 40 is a cylinder coaxial with the stylus support 30, the stylus structure 40 and the stylus support 30 can be fitted in axial direction and can be easily fixed in fixing the components.

Further, since the stylus support 30 also works as the outer cylindrical sleeve 50, the number of components can be reduced, thereby reducing the production cost.

Incidentally, in the present embodiment, since the primary and the secondary coils of the respective coil pairs are parallel to the axis unlike the first and the second embodiments, though the axial length of the stylus support 30 is shortened with the same material and the same performance, diameter of the body tends to be increased.

[Modifications of First to Third Embodiments]

Though the stylus structure 40 and the stylus support 30 are constructed of a pair of structures fitted to form a cylinder which is divided in parallel with the central axis thereof in the first and the second embodiment, the stylus structure 40 and the stylus support 30 may be constructed of a pair of structures fitted to form a polygonal tube which is divided in parallel with the central axis thereof.

Though the stylus support 30 and the stylus structure 40 are formed of a pair of the outer cylinder 31 and the inner cylinder 41 of coaxial cylinder structure having a common axis in the third embodiment, the stylus support 30 and the stylus structure 40 of the third embodiment may be constructed of a pair of inner and outer coaxial polygonal tube.

Figure 4:
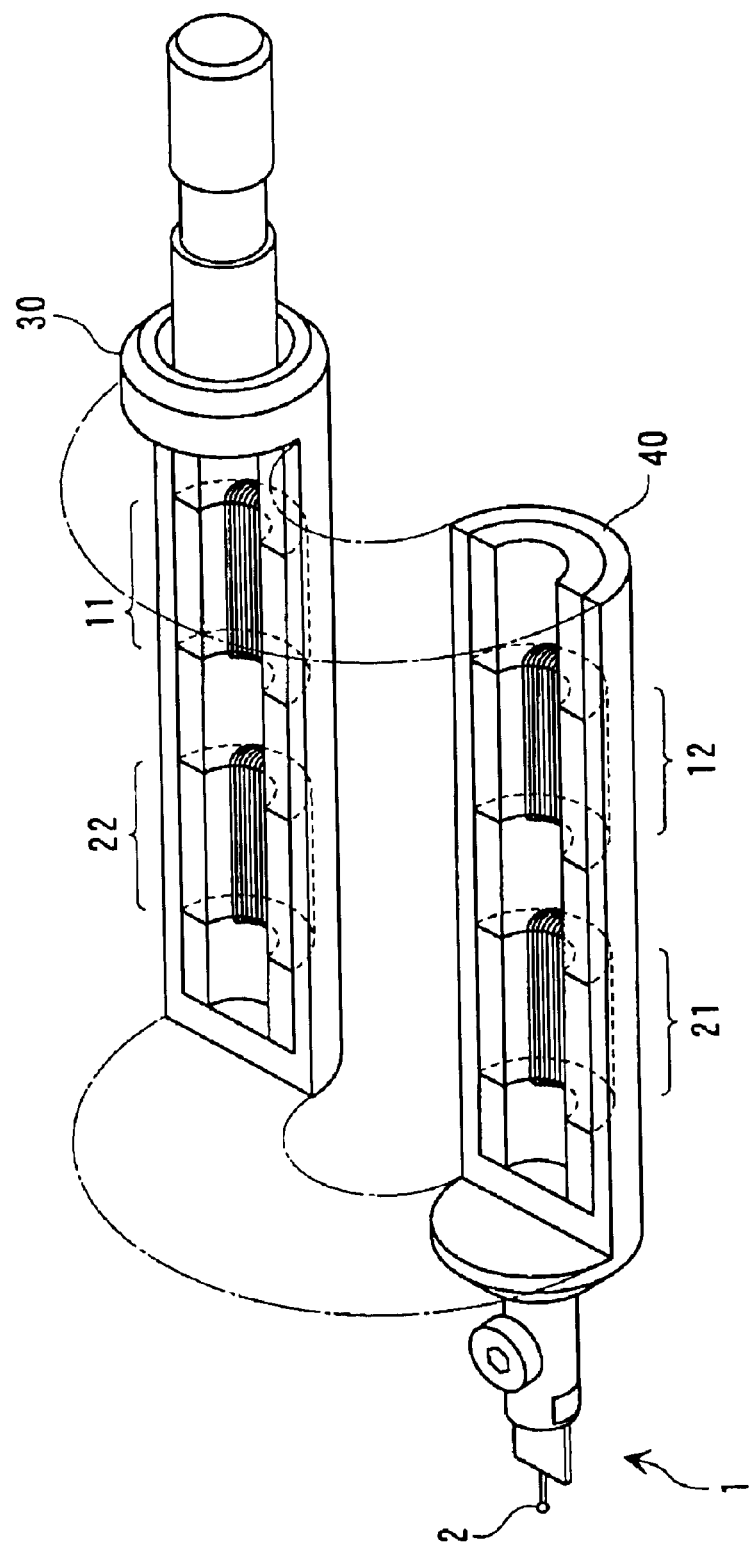
FIG. 4 is an illustration showing a modification of magnetic circuit according to the aforesaid first to third embodiments.

The yoke and the magnetic core of the magnetic circuits 11, 12, 21 and 22 described in the respective first to the third embodiments are not restricted to the above arrangement, but may be, for instance, a toroidal core as shown in FIG. 4 which is ordinarily of less magnetic flux leakage.

[Fourth Embodiment]

In the above respective embodiments, when the detection signal is excessively weak for practical use, an amplifier (integrated circuit driven by direct current) for amplifying the detection signal may preferably be connected between the detector 6 and the second primary coil 21A.

At this time, the electrical alternating current of the medium which transmits the vibration energy is an alternating current of constant amplitude and constant frequency (normally belonging to radio frequency) corresponding to resilient vibration of the stylus 2. However, when there is enough room in the transmission amount received by the first secondary coil 12A, a predetermined direct current can be supplied to the amplifier by the integrated circuit for converting alternating current (AC) and direct current (DC) connected to the secondary coil 12A in parallel with the vibrator 4.

When not so much of transmission amount is received by the secondary coil 12A, third magnetic circuit may be additionally annexed, where the primary coil thereof is provided to the stylus support 30 and the secondary coil thereof is provided to the stylus structure 40, the integrated circuit for converting AC/DC being connected to the secondary coil, thereby supplying a predetermined direct current to the amplifier.

Figure 5:
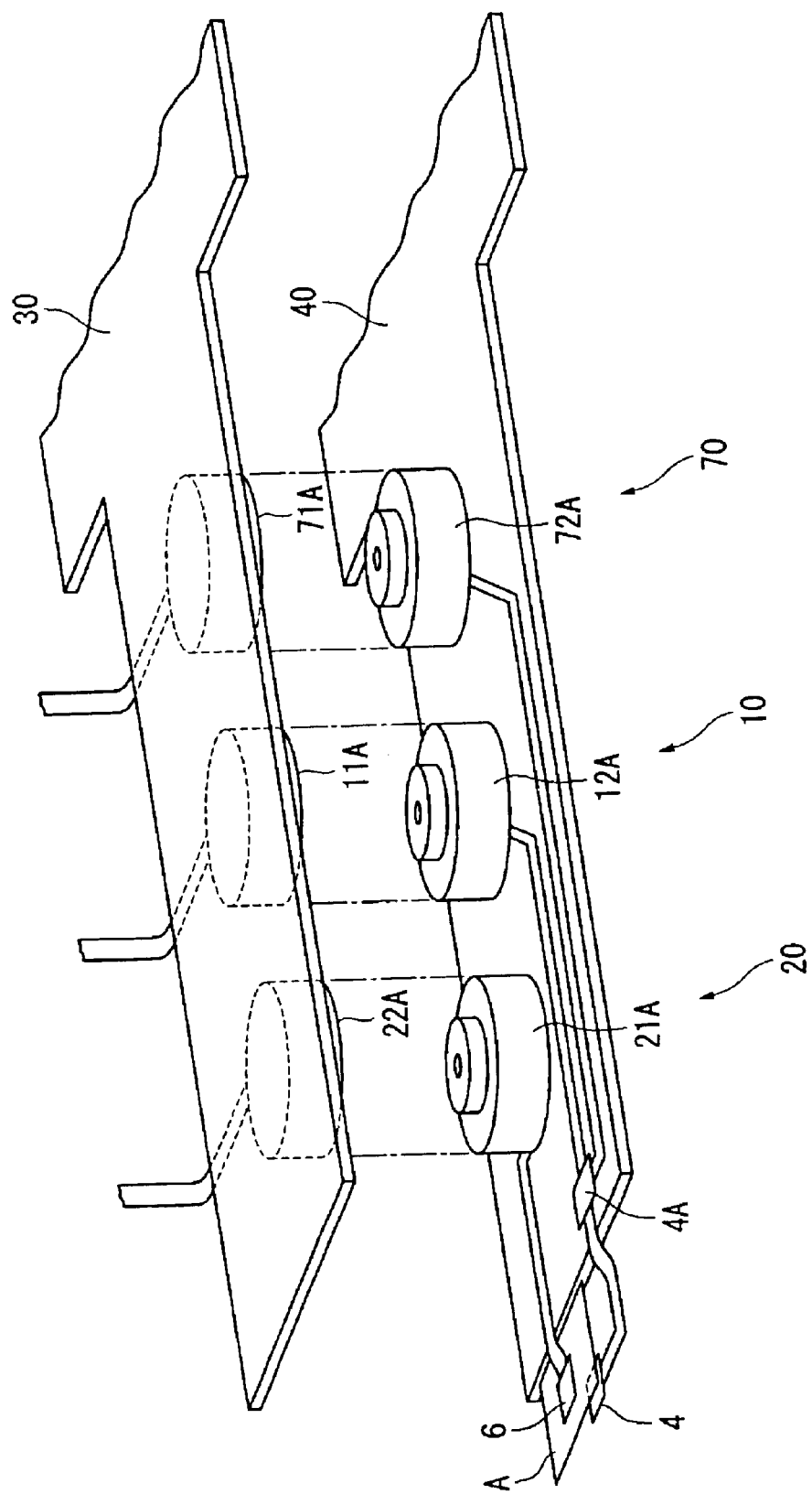
FIG. 5 is an exploded perspective view showing a vibrating contact detection probe according to fourth embodiment of the present invention.

An arrangement for supplying power for the amplifier using the third magnetic circuit is shown, for instance, in FIG. 5.

In FIG. 5, the same first and second magnetic circuits 10 and 20 as the second embodiment are provided between the stylus support 30 and the stylus structure 40 and the vibrator 4 and the detector 6 are provided to the stylus structure 40.

Further, an integrated circuit 4A is provided between the first secondary coil 12A and the vibrator 4 and a third magnetic circuit 70 is located between the stylus support 30 and the stylus structure 40. In the third magnetic circuit 70, a primary coil 71A is provided on the stylus support 30 and a secondary coil 72A is provided on the stylus structure 40. Incidentally, the respective coils 71A and 72A are the same as the above-described coils 11A, 12A, 21A and 22A. The integrated circuit 4A is connected to the secondary coil 72A. By supplying the power for the amplifier to the primary coil 71A on the side of the stylus support 30, the integrated circuit 4A can be used as a power source for the amplifier through the third magnetic circuit 70.

[Fifth Embodiment]

Figure 6:
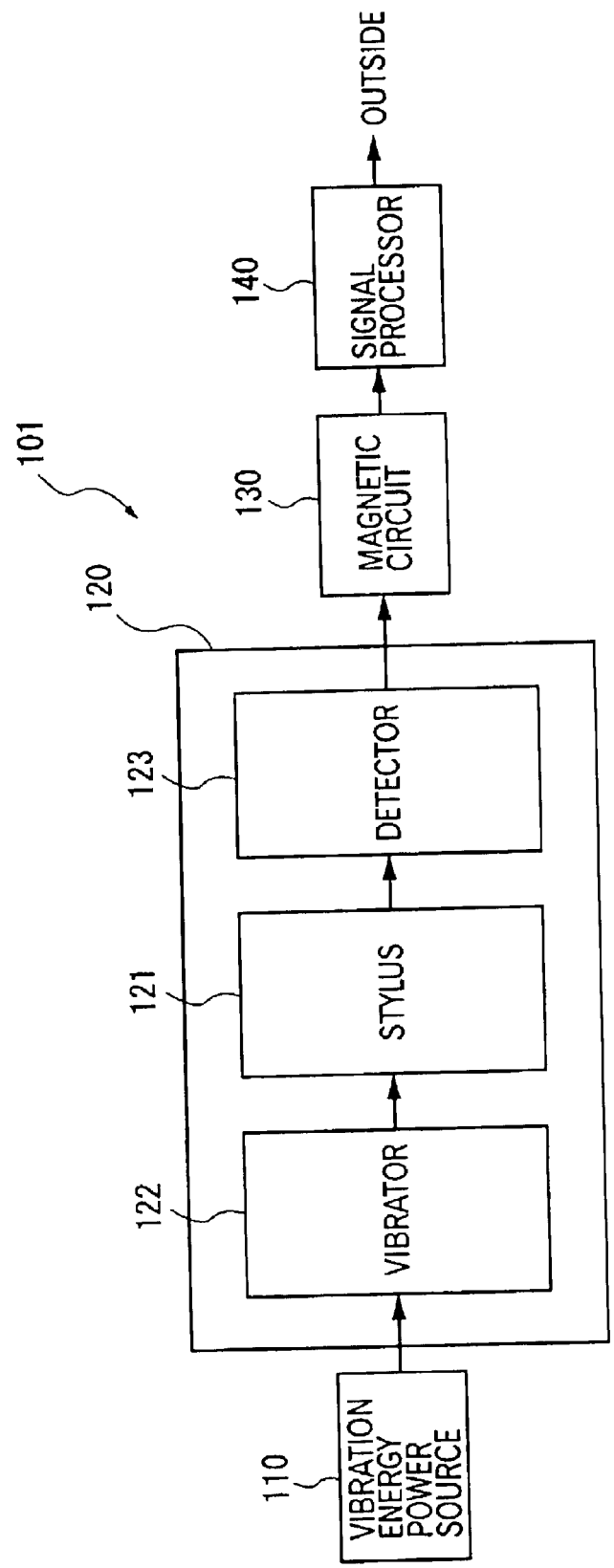
FIG. 6 is a block diagram schematically showing a system according to fifth embodiment of the present invention.

FIG. 6 shows a vibration detecting system 101 according to fifth embodiment of the present invention. The vibration detecting system 101 has a vibration energy power source 110, a contact probe 120, a magnetic circuit 130 and a signal processor 140. The vibration energy power source 110 provides a predetermined alternating current signal to a below-described vibrator 122 of the contact probe 120.

Figure 7:
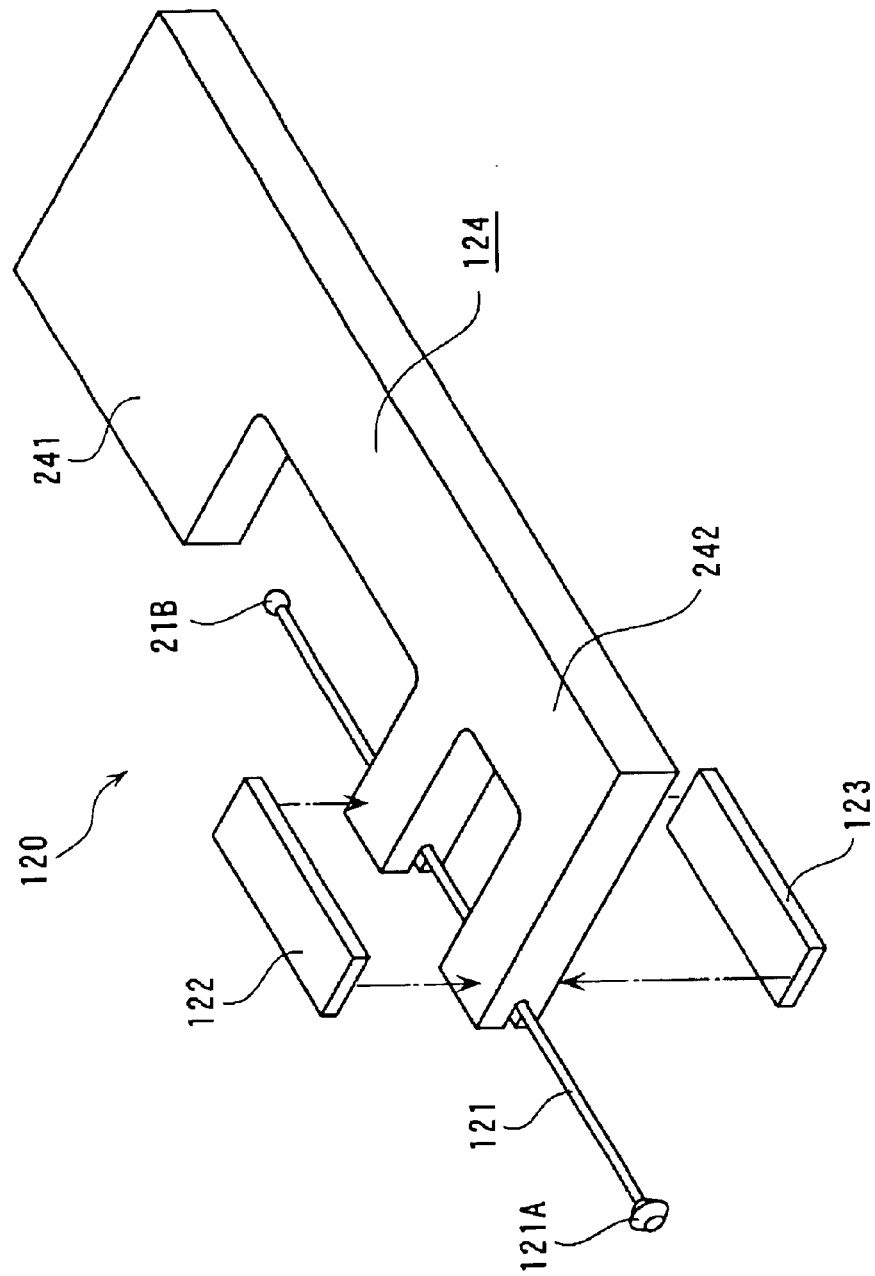
FIG. 7 is a perspective view showing a contact probe according to fifth embodiment of the present invention.

As specifically shown in FIG. 7, the contact probe 120 has a stylus 121 as a resilient body of the present invention, a vibrator 122 for vibrating the stylus 121, and a detector 123 for detecting the vibration of the stylus 121.

The stylus 121 is formed in an approximate cylinder having a disk-shaped contact portion 121A to be in contact with a workpiece on a distal end thereof and a counter balance 121B on a rear end thereof, as necessary. The stylus 121 is held by a stylus holder 124 at the central portion thereof.

The stylus holder 124 has a fixing portion to be attached to a movement shaft of a measuring instrument (not shown: e.g. height gauge, coordinate measuring machine, surface texture measuring machine and small hole measuring machine), and a stylus attachment 242 for bonding and fixing the stylus 121, the fixing portion 241 and the stylus attachment 242 being integrally formed. The stylus attachment 242 is branched in two parts, the two parts supporting the two points of the stylus 121 along the axial direction. The distal end of the stylus attachment 242 for the stylus 121 to be bonded is formed in a C-shaped cross section and the stylus 121 is located in the opening thereof.

The vibrator 122 and the detector 123 are respectively composed of a vibrating piezoelectric element and a detector piezoelectric element. Electrodes are formed on the top and bottom side of the two piezoelectric elements. The piezoelectric elements are disposed in an opposing manner, which are respectively attached on the upper and lower surface of the branch of the stylus attachment 24 spanning over the branch. Incidentally, alternating current signal from the vibration energy power source 110 is applied to vibrate the vibrator 122.

As shown in FIG. 8, the magnetic circuit 130 has an approximately square frame core member 133, a primary coil 131 and a secondary coil 132 wound respectively around opposing two sides of the core member 133, thereby achieving close electromagnetic connection between the primary coil 131 and the secondary coil 132.

Both ends of the primary coil 131 are respectively connected to both ends of the detector 123 of the contact probe 120 and electric charge generated on both ends of the detector 123 (detecting piezoelectric element) is applied to the primary coil 131. In other words, voltage is applied to the primary coil 131 by the detector 123.

On the other hand, the both ends of the secondary coil 132 are connected to the signal processor 140. The signal processor 140 receives alternating current signal (output signal) from the secondary coil 132 and outputs a signal to the outside based on the analysis result of the alternating current signal.

In thus arranged magnetic circuit 130, when the detection signal (voltage) from the detector 123 is applied to the primary coil 131, the output signal (alternating current signal) is generated on the secondary coil 132 by mutual induction.

Coil has a general tendency that impedance is raised in accordance with the frequency of electric current, so that high-frequency electric current is difficult to flow through the coil. Accordingly, when high-frequency component is included in the detection signal from the detector 123 received by the primary coil 131, an output signal from which the high-frequency component is substantially removed is generated on the secondary coil 132.

The ratio of winding number of the primary coil 131 and the secondary coil 132 are determined at a predetermined ratio where the winding number of the secondary coil 132 is more than the winding number of the primary coil 131. Accordingly, the amplitude of the output signal amplified by boosting the amplitude of the detection signal received by the primary coil 131 can be generated on the secondary coil 132.

Next, a function of the present embodiment will be described below.

Initially, electric energy is applied to the vibrator 122 by the vibration energy power source 110, in other words, voltage of a predetermined frequency is applied to the vibrating piezoelectric element to vibrate the stylus 121 with a main vibration mode (e.g. primary vibration mode).

At this time, multiple vibration mode including high-frequency component is generated on the stylus 121 in addition to the main vibration mode by virtue of the configuration of the stylus 121, the mass of the stylus holder 124 for the stylus 121 to be attached, the vibrator 122 attached to the stylus 121 and the mass of the detector 123.

The vibration of the multiple vibration mode of the stylus 121 is directly transferred to the detector 123 (detecting piezoelectric element) and the detector 123 is also vibrated with a multiple vibration mode as in the stylus 121. Accordingly, the action of the vibration of the multiple vibration mode as well as the action of the vibration of the main vibration mode is reflected on the detection signal generated by the detector 123.

When the detection signal (voltage) from the detector 123 is applied to the primary coil 131, the output signal (alternating current signal) is generated on the secondary coil 132 by mutual induction. As described above, since the coil has a tendency of hindering flow of high-frequency electric current, when the high-frequency component is included in the detection signal from the detector 123 received by the primary coil 131, the output signal from which the high-frequency component is substantially removed is generated on the secondary coil 132. Accordingly, the noise of the action of the vibration of the main vibration mode can be substantially removed, thereby obtaining an output signal having improved S/N ratio.

By analyzing and processing the output signal highly accurately reflecting the action of the vibration of the main vibration mode with the signal processor 140, the vibrating condition of the stylus 121 can be recognized with high accuracy.

Such vibration detecting system 101 is used for a contact touch trigger probe such as a coordinate measuring machine, for instance.

Specifically, when the stylus 121 is vibrated with a main vibration mode along axial direction by the vibrator 122, the workpiece and the contact probe 120 are relatively moved. When the contact portion 121A of the stylus 121 touches the workpiece, the vibration of the stylus 121 is restricted and the vibration of the main vibration mode of the stylus is damped.

Since the high-frequency component of the detection signal from the detector 123 is substantially removed by the magnetic circuit 130, the damp of the vibration of the main vibration mode can be detected by the signal processor 140 with high accuracy. By setting the signal processor 140 to output a signal to the outside when the vibration of the main vibration mode is damped to a predetermined level, the contact between the stylus 121 and the workpiece can be securely detected and the measurement pressure by the coordinate measuring machine etc. can be made always constant.

According to the above-described present embodiment, following advantages can be obtained.

(1) In the vibration detecting system 101, since the detection signal from the detector 123 is received by the primary coil 131 of the magnetic circuit 130 and the vibration of the stylus 121 is detected using the output signal generated by the secondary coil 132 by mutual induction, the high-frequency component of the detection signal corresponding to multiple vibration mode as a noise can be substantially removed. Accordingly, the function of the external force applied on the stylus 121 (such as contact with the workpiece) can be recognized by the change in the output signal generated by the secondary coil 132 with high accuracy.

Further, since close electromagnetic connection is established between the primary coil 131 and the secondary coil 132 in the magnetic circuit 130, voltage is generated on the secondary coil 132 when the alternating current signal runs through the primary coil 131 and no voltage is generated on the secondary coil 132 when direct current signal having no change in electric current runs through the primary coil 131. Accordingly, even when static electricity is generated upon contact of the stylus 121 with workpiece etc., since the static electricity is direct current, the influence on the voltage generated by the secondary coil 132 can be avoided.

(2) Since the vibrator 122 and the detector 123 are constructed by attaching the two piezoelectric elements on the stylus 121, the structure of the vibration detecting system 101 can be simplified and the production cost thereof can be reduced. Incidentally, though the piezoelectric element is attached to the stylus 121 through the stylus attachment 242 in the present embodiment, the piezoelectric element may be directly attached to the stylus 121, which is included in the scope of the present invention.

(3) Since the winding number of the secondary coil 132 is more than the winding number of the primary coil 131, the amplitude of the output signal amplified by boosting the amplitude of the detection signal received by the primary coil 131 can be generated in the secondary coil 132.

[Sixth Embodiment]

FIG. 9 shows a vibration detecting system 102 according to sixth embodiment of the present invention. The present embodiment differs from the above-described fifth embodiment in the arrangement of the detector for detecting the vibration of the stylus and the rest of the arrangement and function thereof are the same. Accordingly, the same reference numeral will be attached to the same structure and arrangement to omit or simplify the description thereof. Incidentally, in the present embodiment, illustration of a part of the vibration energy source and the contact probe is omitted.

In FIG. 9, the detector of the vibration detecting system 102 is composed of a laser Doppler device 150 as a non-contact detecting element located around the stylus 121.

The laser Doppler device 150 utilizes Doppler effect and optical heterodyne method to detect vibration frequency and outputs a detection signal to the primary coil (not shown) of the magnetic circuit 130 in accordance with the detected vibration frequency.

In thus arranged vibration detecting system 102, when vibration with the main vibration mode is applied on the stylus 121 is vibrated, the stylus 121 is vibrated with a multiple vibration mode including high-frequency component being influenced by the configuration thereof etc. The vibration of the stylus 121 is detected by the laser Doppler device 150 to output a detection signal in accordance with vibration to the primary coil of the magnetic circuit 130. In the magnetic circuit 130, since the high-frequency component of the detection signal from the detector 123 is substantially removed, the signal processor 140 can detect the vibration of main vibration mode with high accuracy.

According to the above-described present embodiment, following advantages as well as the advantages (1) and (3) of the fifth embodiment can be obtained.

(4) Since the detector is constructed by the laser Doppler device 150, the influence on the vibration of the stylus 121 on account of the contact between the stylus 121 and the detector can be eliminated, thereby detecting the vibration of the stylus 121 with higher accuracy.

[Modification of Fifth to Sixth Embodiments]

Though the laser Doppler device 150 is used as a non-contact detecting element constituting the detector in the sixth embodiment, an optical fiber displacement meter for detecting the vibration frequency by irradiating light irradiated from optical fiber to the stylus 121 and detecting the information on the reflected light and outputting detection signal in accordance with the detected vibration frequency may be used. In short, any element may be used as long as the vibration of the stylus 121 can be detected in a non-contact manner.

Though the detector 123 is constructed of a piezoelectric element in the fifth embodiment, the detector 123 may be constructed of a strain detecting element such as a strain gauge outputting electric potential in accordance with strain of an object, which is included in the scope of the present invention.

Though the vibration detecting systems 101 and 102 are used for a coordinate measuring machine, the vibration detecting system may be used for various measuring instruments such as a height gauge, surface texture measuring machine and small hole measuring machine, which is included in the scope of the present invention.

What is claimed is:

1. A vibrating contact detection probe, comprising:
    a shaft-shaped stylus having a contact portion to be in contact with a workpiece;
    a vibrator for causing resilient vibration to the stylus when electrical alternating current energy is applied thereto;
    a detector for detecting the action of the vibration changing in accordance with contact of the contact portion with the workpiece;
    a vibration energy transmitter for applying the electrical alternating current energy to the vibrator;
    a detection signal transmitter connected to the detector; and
    a stylus support and a stylus structure being mutually fitted,
    the vibration energy transmitter having a first primary magnetic circuit having a first primary coil connected to a vibration energy source and a first secondary magnetic circuit having a first secondary coil connected to the vibrator,
    the detection signal transmitter including a second primary magnetic circuit having a second primary coil connected to the detector and a second secondary magnetic circuit having a second secondary coil for fetching the detection signal,
    the stylus, the vibrator, the detector, the first secondary magnetic circuit and the second primary magnetic circuit being integrated on the stylus structure, the first primary magnetic circuit and the second secondary magnetic circuit being integrated on the stylus support,
    wherein, when the stylus structure and the stylus support are fitted, electromagnetic connection is established between the first primary magnetic circuit and the first secondary magnetic circuit and between the second primary magnetic circuit and the second secondary magnetic circuit and mechanical position of the stylus relative to the stylus support can be reproduced.

2. The vibrating contact detection probe according to claim 1, wherein the second primary magnetic circuit and the second secondary magnetic circuit are disposed without being in electromagnetic connection with the other electromagnetic system of the stylus structure and the other electromagnetic system of the stylus support.

3. The vibrating contact detection probe according to claim 1, wherein the respective pairs of the first primary and secondary coils and the second primary and secondary coils are disposed coaxially along an axial direction of the stylus.

4. The vibrating contact detection probe according to claim 2, wherein the first primary and secondary coils and the second primary and secondary coils are constructed of a toroidal coil.

5. The vibrating contact detection probe according to claim 1, wherein the stylus structure and the stylus support are formed by a pair of structures fitted to form a cylinder or a polygonal tube which is separated in parallel with a central axis thereof.

6. The vibrating contact detection probe according to claim 1, wherein the stylus structure and the stylus support are formed by an inner and outer coaxial cylinders having a common axis or a pair of coaxial inner and outer polygonal tubes.

7. The vibrating contact detection probe according to claim 1, further comprising an amplifier of the detector, the amplifier being driven by a power generated by the first secondary coil using a part of electrical alternating current energy.

8. The vibrating contact detection probe according to claim 1, further comprising an amplifier of the detector, the amplifier being driven by a power generated using a part of electrical alternating current energy supplied by a third coil independent of the first primary and secondary coils and the second primary and secondary coils.

\* \* \* \* \*